United States Patent
Makida et al.

(10) Patent No.: US 10,142,418 B2
(45) Date of Patent: Nov. 27, 2018

(54) STORAGE MANAGEMENT DEVICE, STORAGE MANAGEMENT METHOD, AND COMPUTER-READABLE RECORDING MEDIUM

(71) Applicant: FUJITSU LIMITED, Kawasaki-shi, Kanagawa (JP)

(72) Inventors: Toshiharu Makida, Numazu (JP); Kiyoshi Sugioka, Mishima (JP); Joichi Bita, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 14/926,054

(22) Filed: Oct. 29, 2015

(65) Prior Publication Data

US 2016/0142335 A1 May 19, 2016

(30) Foreign Application Priority Data

Nov. 19, 2014 (JP) ................................. 2014-235084

(51) Int. Cl.
*H04L 12/26* (2006.01)
*H04L 29/08* (2006.01)
(Continued)

(52) U.S. Cl.
CPC ........ *H04L 67/1097* (2013.01); *G06F 3/0689* (2013.01); *H04L 41/0896* (2013.01);
(Continued)

(58) Field of Classification Search
CPC ............... G06F 3/0689; H04L 67/1097; H04L 43/0817; H04L 43/0852; H04L 43/0888; H04L 41/0896; H04L 47/781
See application file for complete search history.

(56) References Cited

U.S. PATENT DOCUMENTS 6,397,258 B1 5/2002 Tsuji et al.
6,408,359 B1 6/2002 Ito et al.
(Continued)

FOREIGN PATENT DOCUMENTS

JP 9-006678 A 1/1997
JP 10-275059 A 10/1998
(Continued)

OTHER PUBLICATIONS

U.S. Office Action dated Oct. 6, 2017 for co-pending U.S. Appl. No. 15/132,504, 23 pages.
(Continued)

*Primary Examiner* — Kim T Nguyen
(74) *Attorney, Agent, or Firm* — Fujitsu Patent Center (57) ABSTRACT

A monitoring unit acquires load information on a Tier pool that includes therein a plurality of volumes. A maximum performance calculating unit calculates an entire bandwidth of the Tier pool on the basis of the load information on the Tier pool acquired by the monitoring unit. A bandwidth management unit calculates each individual bandwidth such that the sum of the individual bandwidths allocated to each of the volumes corresponds to the entire bandwidth calculated by the maximum performance calculating unit and allocates each of the calculated individual bandwidths to each of the volumes.

9 Claims, 8 Drawing Sheets (51) Int. Cl.
  *H04L 12/24* (2006.01)
  *G06F 3/06* (2006.01)
  *H04L 12/911* (2013.01)

(52) U.S. Cl.
  CPC ........ *H04L 47/781* (2013.01); *H04L 43/0817* (2013.01); *H04L 43/0852* (2013.01); *H04L 43/0888* (2013.01)

(56) References Cited

U.S. PATENT DOCUMENTS

| | | | |
|---|---|---|---|
| 7,305,520 | B2 | 12/2007 | Voigt et al. |
| 8,209,511 | B2 * | 6/2012 | Tomita .................. G06F 3/0613 711/114 |
| 8,683,025 | B2 | 3/2014 | Minato |
| 8,843,672 | B2 | 9/2014 | Oe et al. |
| 2004/0043755 | A1 | 3/2004 | Shimooka et al. |
| 2004/0181594 | A1* | 9/2004 | Suleiman ............ H04L 67/1097 709/225 |
| 2005/0172097 | A1 | 8/2005 | Voigt et al. |
| 2007/0283120 | A1 | 12/2007 | Fujita et al. |
| 2008/0126525 | A1 | 5/2008 | Ueoka et al. |
| 2009/0307341 | A1 | 12/2009 | Minato |
| 2011/0252214 | A1 | 10/2011 | Naganuma et al. |
| 2012/0265907 | A1 | 10/2012 | Oe et al. |
| 2012/0317358 | A1 | 12/2012 | Ando et al. |
| 2013/0159557 | A1 | 6/2013 | Bita |
| 2014/0244959 | A1 | 8/2014 | Oe et al. |
| 2014/0317348 | A1 | 10/2014 | Watanabe et al. |
| 2016/0364167 | A1* | 12/2016 | Makida ................. G06F 3/0631 |

FOREIGN PATENT DOCUMENTS

| | | |
|---|---|---|
| JP | 2001-057571 | 2/2001 |
| JP | 2004-086512 A | 3/2004 |
| JP | 2005-050007 A | 2/2005 |
| JP | 2005-222539 | 8/2005 |
| JP | 2007-323284 A | 12/2007 |
| JP | 2008-083939 A | 4/2008 |
| JP | 2009-294810 | 12/2009 |
| JP | 2012-221340 | 11/2012 |
| JP | 2014-164510 A | 9/2014 |
| JP | 2014-215666 A | 11/2014 |
| WO | 2011/092739 A1 | 8/2011 |
| WO | 2012/169027 A1 | 12/2012 |

OTHER PUBLICATIONS

U.S. Office Action dated Feb. 22, 2018 for co-pending U.S. Appl. No. 15/132,504, 18 pages.

Japanese Office Action dated May 15, 2018 for corresponding Japanese Patent Application No. 2014-235084, with English Translation, 7 pages.

U.S. Notice of Allowance dated May 1, 2018 for co-pending U.S. Appl. No. 15/132,504, 9 pages.

* cited by examiner

| VOLUME IDENTIFICA-TION INFORMATION | TIER POOL NUMBER | BANDWIDTH |
|---|---|---|
| Storage=1, VolNo=1 | 1 | 10MB/s, 100IOPS |
| Storage=1, VolNo=2 | 1 | 20MB/s, 200IOPS |
| Storage=2, VolNo=1 | 2 | 15MB/s, 150IOPS |
| Storage=2, VolNo=2 | 3 | 100MB/s, 1000IOPS |

FIG.5

| PERFORMANCE MEASUREMENT DATE AND TIME | VOLUME IDENTIFICATION INFORMATION | ACTUAL MEASUREMENT PERFORMANCE ||||||
|---|---|---|---|---|---|---|
| | | RESPONSE TIME | THROUGH-PUT | IOPS | CACHE HIT RATE | DELAY TIME |
| 20110101000000 TO 20110101000030 | Storage=1, VolNo=1 | 10ms | 12MB/s | 100IOPS | 10% | 0ms |
| 20110101000000 TO 20110101000030 | Storage=1, VolNo=2 | 11ms | 9MB/s | 100IOPS | 9% | 1ms |
| 20110101000000 TO 20110101000030 | Storage=2, VolNo=1 | 12ms | 8MB/s | 100IOPS | 8% | 2ms |
| 20110101000000 TO 20110101000030 | Storage=2, VolNo=2 | 13ms | 7MB/s | 100IOPS | 7% | 3ms |
| 20110101000030 TO 20110101000100 | Storage=1, VolNo=1 | 11ms | 11MB/s | 110IOPS | 10% | 0ms |
| 20110101000030 TO 20110101000100 | Storage=1, VolNo=2 | 12ms | 10MB/s | 120IOPS | 9% | 1ms |
| 20110101000030 TO 20110101000100 | Storage=2, VolNo=1 | 13ms | 9MB/s | 130IOPS | 8% | 2ms |
| 20110101000030 TO 20110101000100 | Storage=2, VolNo=2 | 14ms | 8MB/s | 140IOPS | 7% | 3ms |

| PERFORMANCE MEASUREMENT DATE AND TIME | RESOURCE TYPE | ACTUAL MEASUREMENT PERFORMANCE ||||
|---|---|---|---|---|---|
| | | IDENTIFICATION INFORMATION | THROUGHPUT | IOPS | BUSY RATE |
| 20110101000000 TO 20110101000030 | TierPool | 1 | 102MB/s | 100IOPS | 10% |
| 20110101000000 TO 20110101000030 | TierPool | 2 | 91MB/s | 100IOPS | 9% |

STORAGE MANAGEMENT DEVICE, STORAGE MANAGEMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2014-235084, filed on Nov. 19, 2014, the entire contents of which are incorporated herein by reference.

FIELD

The embodiments discussed herein are directed to a storage management device, a storage management method, and a computer-readable recording medium.

BACKGROUND

In recent years, with the virtualization of open systems and servers, management of systems is becoming complicated. Consequently, using storage systems becomes common in terms of easily managing the systems or flexibly coping with a rapid increase in an amount of data.

In the storage systems, performance adjustment of the storage systems is performed by adjusting the band limit width of a data transfer path between, for example, a volume and a server that executes an application. In a conventional technology, adjustment of the band limit width is performed by a storage system that received an instruction from an administrator.

Furthermore, as a technology for adjusting the performance in a storage system, there is a conventional technology that performs control such that, by performing IO control of one area by using a busy rate, the IO performance in the other area does not fall below a predetermined performance. Furthermore, there is a conventional technology that divides, by specifying each band that is allocated to individual volumes, a band and allocates the divided bands to each of the volumes. Furthermore, there is a conventional technology that divides, by performing proportional distribution on each band by using the number of commands on the server side, a band and allocates the divided bands to each of the volumes. Furthermore, there is a conventional technology that selects a line between a storage device and a business server in accordance with the actual load and allocates a band to a storage device.

Patent Document 1: Japanese Laid-open Patent Publication No. 2012-221340
Patent Document 2: Japanese Laid-open Patent Publication No. 2001-57571
Patent Document 3: Japanese Laid-open Patent Publication No. 2009-294810
Patent Document 4: Japanese Laid-open Patent Publication No. 2005-222539

However, in the method that specifies each band to be allocated to individual volumes, if a target performance is manually set for each volume in order to limit the band, the setting of the band limit is complicated. Furthermore, if a bandwidth of a single volume is adjusted, contention occurs with another volume when data is transferred and the load applied to the other volume is increased, which may possibly result in a decrease in the performance.

Furthermore, if the conventional technology that adjusts the performance of another area by using a busy rate, because the maximum performance is not used, it is difficult to easily set an appropriate bandwidth. Furthermore, with the conventional technology that limits a bandwidth on the server side, because a complicated configuration needs to be used for a server, it is difficult to easily implement performance adjustment. Furthermore, if the conventional technology that selects a line and allocates a band is used, it is difficult to easily implement the performance adjustment because a plurality number of lines need to be prepared.

SUMMARY

According to an aspect of an embodiment, a storage management device includes: a memory and a controller that acquires load information on a storage area group that includes a plurality of storage areas, stores the load information in the memory, calculates an entire bandwidth of the storage area group on the basis of the acquired load information on the storage area group, and calculates each individual bandwidth such that the sum of the individual bandwidths allocated to each of the storage areas corresponds to the entire bandwidth calculated and that allocates each of the individual bandwidths to each of the storage areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The storage management device, the storage management method, and the storage management program are not limited to the embodiments described below.

[a] First Embodiment

Figure 1:
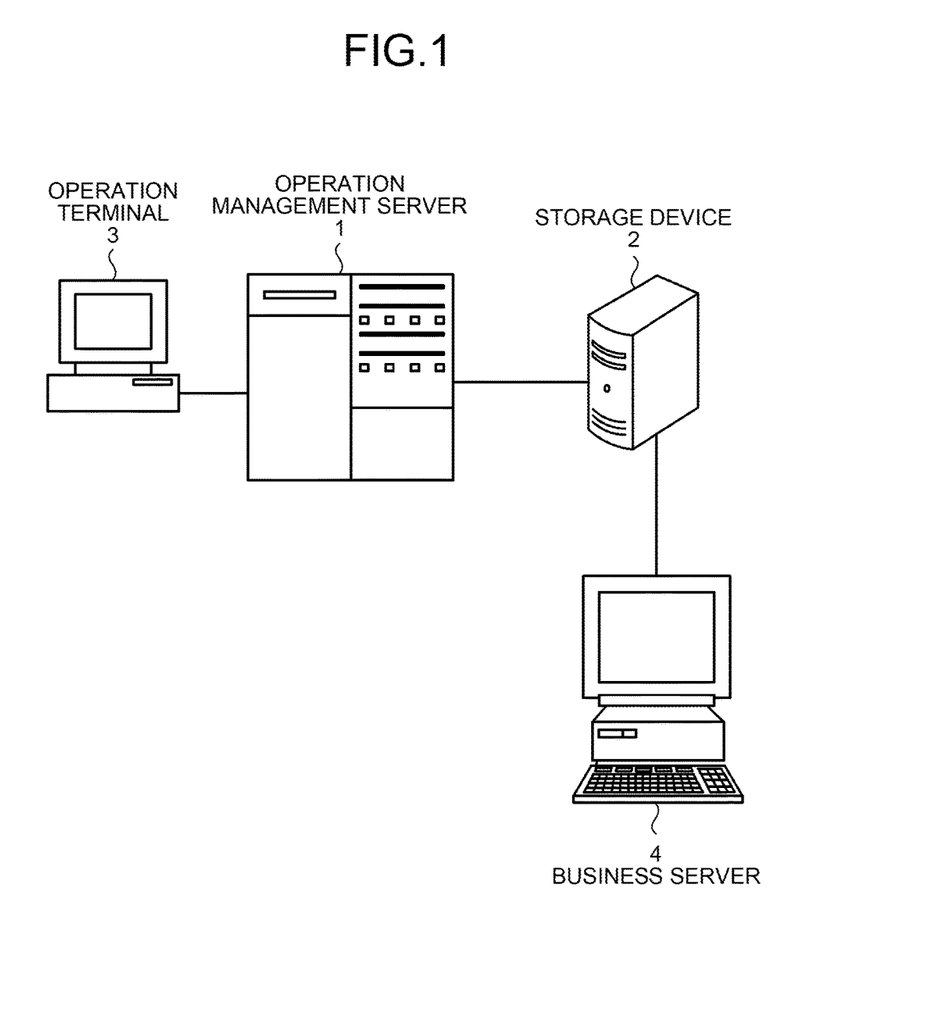
FIG. 1 is a schematic diagram illustrating, in outline, the configuration of a storage system according to a first embodiment.

FIG. 1 is a schematic diagram illustrating, in outline, the configuration of a storage system according to a first embodiment. As illustrated in FIG. 1, the storage system according to the first embodiment includes an operation management server 1, a storage device 2, an operation terminal 3, and a business server 4. FIG. 1 illustrates the single storage device 2; however, the number of the storage devices 2 is not limited. Furthermore, only the single business server 4 illustrated in FIG. 1; however, the number of the business servers 4 is not also limited.

The operation terminal 3 is connected to the operation management server 1 via a network. The operation terminal 3 sends, for example, an instruction of a process to be performed on the storage device 2 to the operation management server 1. Furthermore, the operation terminal 3 displays, for example, a message sent from the operation management server 1 on a monitor and notifies an operator of the message. Furthermore, in response to an instruction received from a display control unit 105 in the operation management server 1, which will be described later, the operation terminal 3 displays an input screen on a monitor.

The operation management server 1 operates and manages the storage device 2. The operation management server 1 executes a Quality of Service (QoS) control program and a storage management program. The operation management server 1 corresponds to an example of a "storage management device".

Specifically, the operation management server 1 performs QoS control in the storage device 2. The QoS mentioned here is a performance setting function that is used for the storage device 2 to maintain the stable performance and that adjusts, for example, a bandwidth of a volume, which will be described later. Furthermore, the operation management server 1 controls the storage device 2 in accordance with a command that is input from the operation terminal 3. For example, the operation management server 1 instructs the storage device 2 to configure the RAID that is input from the operation terminal 3.

In response to an instruction received from an application that is running on the business server 4, the storage device 2 reads or writes data by applying a QoS. Furthermore, in response to an instruction received from the operation management server 1 indicating, for example, the adjustment of the bandwidth of a volume, the storage device 2 controls the QoS.

The business server 4 executes a business application. When the business server 4 executes the application, the business server 4 reads or writes data from or to the storage device 2. The application executed by the business server 4 is not particularly limited as long as the application that sends and receives data to and from the storage device 2.

Figure 2:
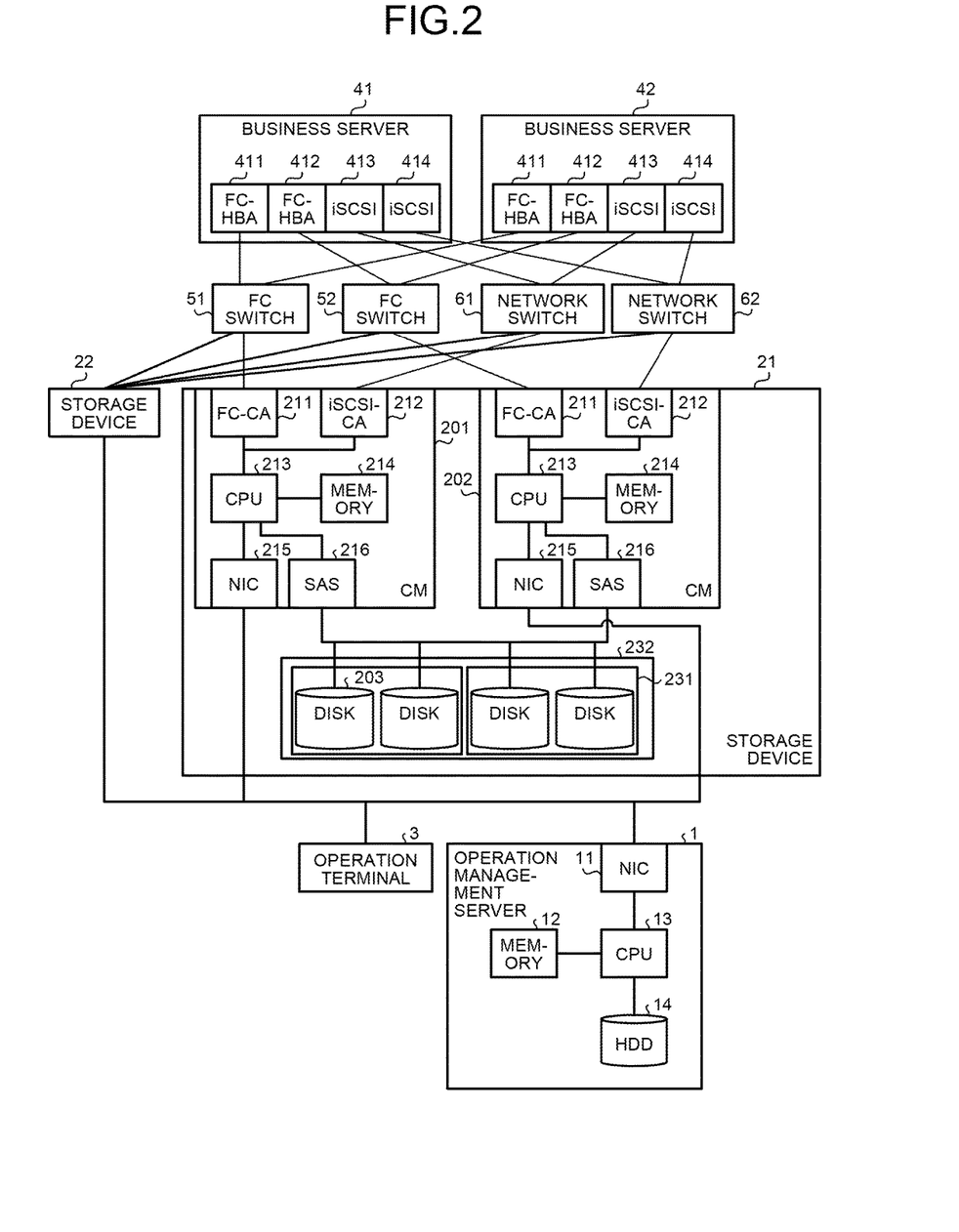
FIG. 2 is a schematic diagram illustrating the hardware configuration of the storage system.

FIG. 2 is a schematic diagram illustrating the hardware configuration of the storage system. FIG. 2 is a schematic diagram illustrating the hardware configuration of the storage system. FIG. 2 illustrates the state in which storage devices 21 and 22 are arranged as the storage device 2. Furthermore, FIG. 2 illustrates the state in which business servers 41 and 42 are arranged as the as the business server 4.

The operation management server 1 includes Network Interface Card (NIC) 11, Memory 12, a central processing unit (CPU) 13 and Hard Disk Drive (HDD) 14.

The business server 4 includes fiber channel-host bus adapters (FC-HBAs) 411 and 412 and internet small computer system interfaces (iSCSIs) 413 and 414. In the first embodiment, the number of the FC-HBAs 411 and 412 is two; however, an arbitrary number of FC-HBAs may also be installed in the business server 4. Furthermore, the number of the iSCSIs 413 and 414 is two; however, an arbitrary number of iSCSIs may also be installed in the business server 4.

The FC-HBAs 411 and 412 are communication interfaces for data communication using a fiber channel. The FC-HBAs 411 and 412 are connected to FC switches 51 and 52, respectively.

The iSCSIs 413 and 414 are communication interfaces for data communication conforming to the iSCSI standard. The iSCSIs 413 and 414 are connected to network switches 61 and 62, respectively.

The FC switches 51 and 52 relay communication between the storage device 2 and the business server 4 performed by using a fiber channel. The FC switches 51 and 52 connect the FC-HBAs 411 and 412 and FC-channel adapters (CAs) 211, respectively.

The network switches 61 and 62 relay communication between the storage device 2 and the business server 4 performed by using iSCSI. The network switches 61 and 62 connect the iSCSIs 413 and 414 to iSCSI-CAs 212, respectively.

The storage device 2 includes controller modules (CMs) 201 and 202 and disks 203.

The CMs 201 and 202 have the same configuration. Accordingly, in the following, a description will be given of the CM 201 as an example.

The CM 201 includes the FC-CA 211, the iSCSI-CA 212, CPU 213, a memory 214, a network interface card (NIC) 215, and a serial attached SCSI (SAS) 216.

The FA-CA 211, the iSCSI-CA 212, the memory 214, the NIC 215, and the SAS 216 are connected to the CPU 213.

The CPU 213 sends and receives data to and from the business server 4 via the FC-CA 211 and the iSCSI-CA 212.

Furthermore, the CPU 213 performs the reading and the writing of data from and to the disks 203 via the SAS 216.

Furthermore, the CPU 213 performs communication between the operation terminal 3 and the operation management server 1 via the NIC 215. For example, when the CPU 213 receives an instruction to adjust the bandwidth, which will be described later, from the operation management server 1, the CPU 213 adjusts the bandwidth of the disk 203 in accordance with the instruction.

A plurality number of disks 203 are mounted on the storage device 2. In FIG. 2, a RAID group is constituted by the plurality number of disks 203 and is structured as a volume 231. The volume 231 is a logical volume. The volume 231 mentioned here corresponds to an example of a "storage area". However, the structure is not limited to the embodiment and it allows that the RAID group is not structured in the disk 203. Furthermore, in FIG. 2, a single RAID group is used as the single volume 231; however, a plurality of volumes 231 may also be formed in a single RAID group. Furthermore, a Tier pool 232 that includes therein the plurality number of volumes 231 is formed. The Tier pool 232 indicates layers in the layered storage device 2. The Tier pool 232 is divided into layers, such as a high-speed layer, a medium-speed layer, a low-speed layer, or the like. The Tier pool 232 corresponds to an example of a "storage area group".

In the following, a description will be given of the writing and the reading of data performed by the CPU 213. The CPU 213 receives, from a business application running on the business server 4, a read command that is an instruction to read data or a write command that is an instruction to write data. At this point, the read command or the write command is sent to the CPU 213 via, for example, the port of the FC switch 51 and the port of the FC-CA 211. Then, the CPU 213 performs the reading or the writing of data from or to the volume 231 of the disk 203 in accordance with the received command. At this point, the data is written to or read from the volume 231 in accordance with the configuration of the RAID group. Furthermore, a description has been given of a case in which the CPU 213 in the CM 201 reads and writes data; however, the same process is also performed in the CPU 213 in the CM 202.

Specifically, in data transfer in which data is written or read, contention occurs in a port of the FC switch 51, in a port of the FC-CA 211 or the iSCSI-CA 212, in the CPU 213 that functions as the processing processor that performs a process on the data, and in the volume 231

If contention occurs in each of the resources at the time of data transfer, the performance of the data transfer is decreased. Accordingly, in a transmission path that is used by the resources in which contention occur, by adjusting the bandwidth of the volume 231 that uses the transmission path, the contention occurring in the resources can be eliminated and thus the performance of the data transfer can be maintained in a high state. Accordingly, in the following, adjustment of the bandwidth of the volume 231 will be described. In the description below, the description will be given of a case in which the business server 4 and the storage device 2 are connected via the FC switch 51. Furthermore, in the description below, the description will be given of using the Tier pool 232 as a unit of adjusting a band of the volume 231; however, the unit of adjusting a band is not limited thereto and, for example, a RAID group or the entirety of the storage device 2 may also be used.

Figure 3:
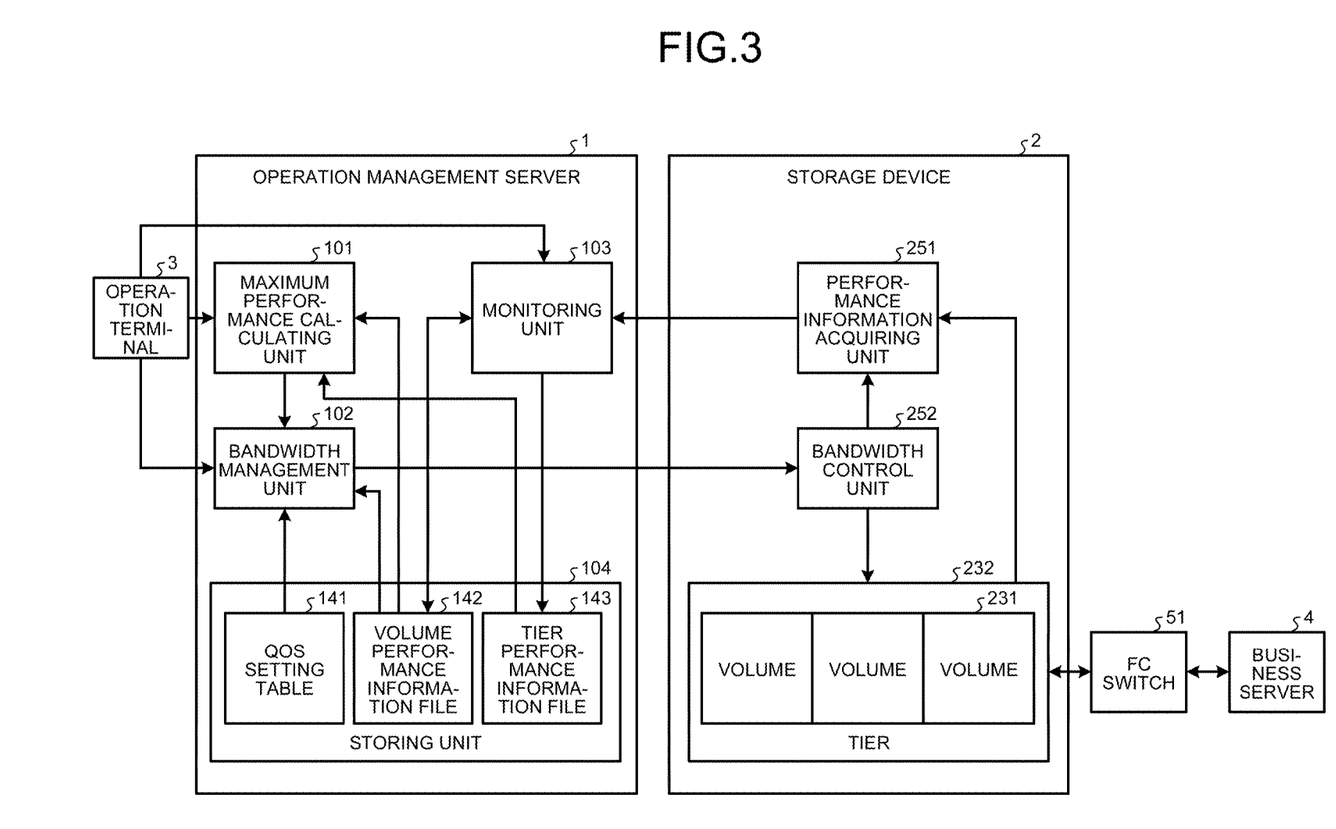
FIG. 3 is a block diagram of an operation management server and a storage device according to the first embodiment.

FIG. 3 is a block diagram of an operation management server and a storage device according to the first embodiment. The operation management server 1 includes a maximum performance calculating unit 101, a bandwidth management unit 102, a monitoring unit 103, and a storing unit 104. Furthermore, the storage device 2 includes a performance information acquiring unit 251 and a bandwidth control unit 252. Furthermore, the storage device 2 includes the Tier pool 232 that includes therein a plurality of volumes 231 created from the disk 203.

The storing unit 104 includes a predetermined information storage area that stores therein each of a QoS setting table 141, a volume performance information file 142, and a Tier performance information file 143. Furthermore, the information storage area does not need to store therein each of the tables themselves but may also store therein information that is used to create a table at the time of control. The function of the storing unit 104 is implemented by, for example, a HDD 14 illustrated in FIG. 2.

Figure 4:
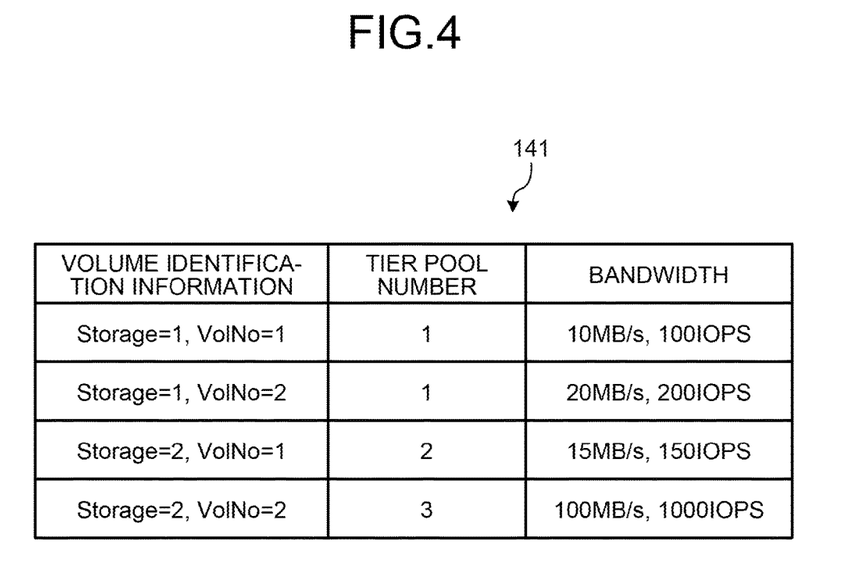
FIG. 4 is a schematic diagram illustrating an example of a QoS setting table.

FIG. 4 is a schematic diagram illustrating an example of a QoS setting table. In the first embodiment, in the QoS setting table 141, volume identification information, a Tier pool number, and a bandwidth are registered in an associated manner.

The volume identification information is information for uniquely specifying the volume 231. In the first embodiment, the volume identification information is represented by both the number allocated to the storage device and the number allocated to the volume 231. For example, if it is assumed that the storage device 21 illustrated in FIG. 2 is No. 1 and the storage device 22 illustrated in FIG. 2 is No. 2, "Storage=1, Vol No=1" indicates the volume 231 in the storage device 21 with the volume number of 1.

Furthermore, the Tier pool number is identification information of the Tier pool 232 to which the volume 231 that stores therein the associated volume identification information belongs.

Furthermore, the bandwidth is a bandwidth that is set in the volume 231 that stores therein the associated volume identification information. In FIG. 4, the bandwidth is represented by two types: an amount of data per second (MB Per Second) that represents the throughput and the number of read/write operations (Input Output Per Second: IOPS).

Figure 5:
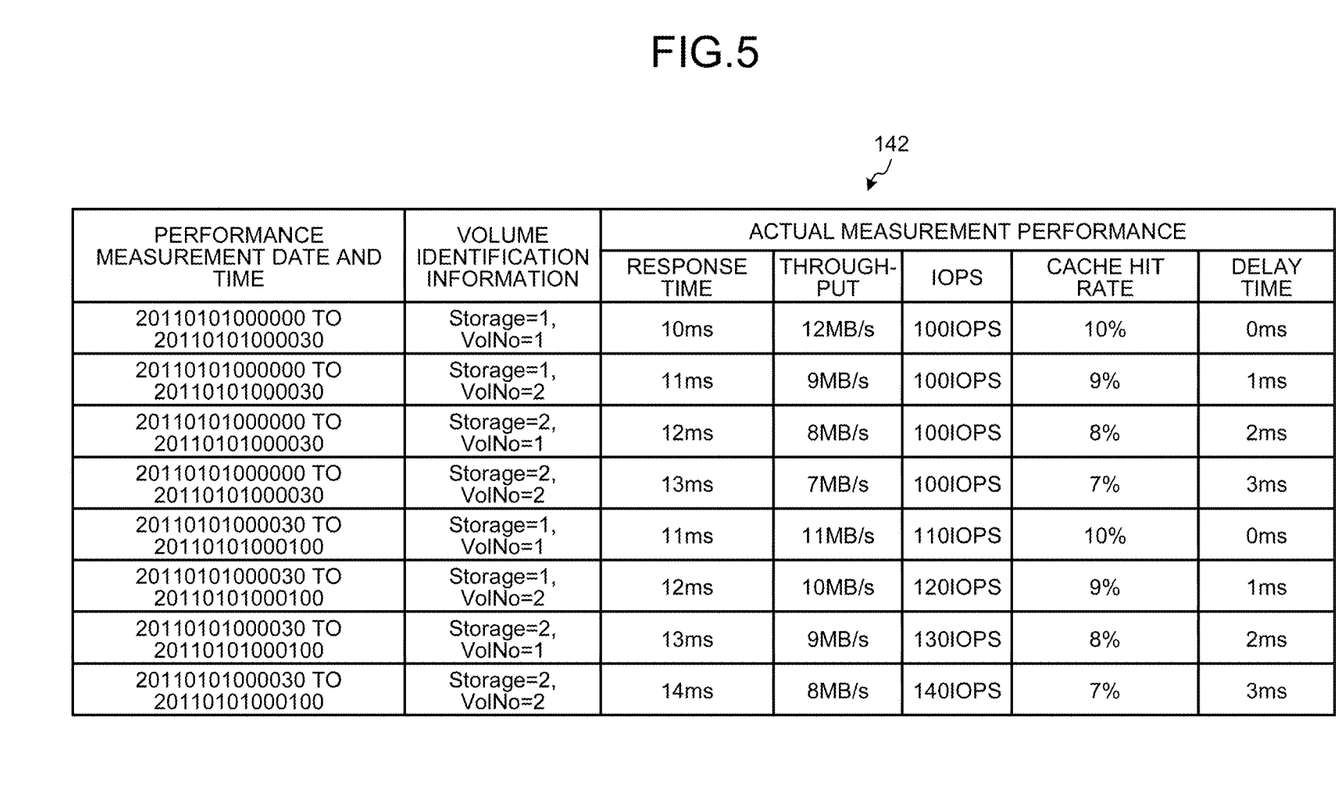
FIG. 5 is a schematic diagram illustrating an example of a volume performance information file.

FIG. 5 is a schematic diagram illustrating an example of a volume performance information file. In the volume performance information file 142, information indicating the performance of the actual measurement of each of the volumes 231 is registered. In the first embodiment, in the volume performance information file 142, in addition to the performance measurement date and time at which the measurement is performed, the volume identification information, the actual measurement response time, the actual measurement throughput, the actual measurement IOPS, the actual measurement cache hit rate, and the actual measurement delay time are registered in an associated manner. In the description below, the volume identification information, the actual measurement response time, the actual measurement throughput, the actual measurement IOPS, the actual measurement cache hit rate, and the actual measurement delay time may sometimes be collectively referred to as "performance information on a volume".

The actual measurement response time is the response time measured when data is read from and written to one of the volumes 231 that includes therein the associated volume identification information. The actual measurement throughput is the throughput measured when data is read from and written to one of the volumes 231 that includes therein the associated volume identification information. The actual measurement IOPS is the IOPS measured when data is read from and written to one of the volumes 231 that includes therein the associated volume identification information. The actual measurement cache hit rate is the cache hit rate measured when data is read from and written to one of the volumes 231 that includes therein the associated volume identification information. The actual measurement delay time is the delay time measured when data is read from and written to one of the volumes 231 that includes therein the associated volume identification information.

Figure 6:
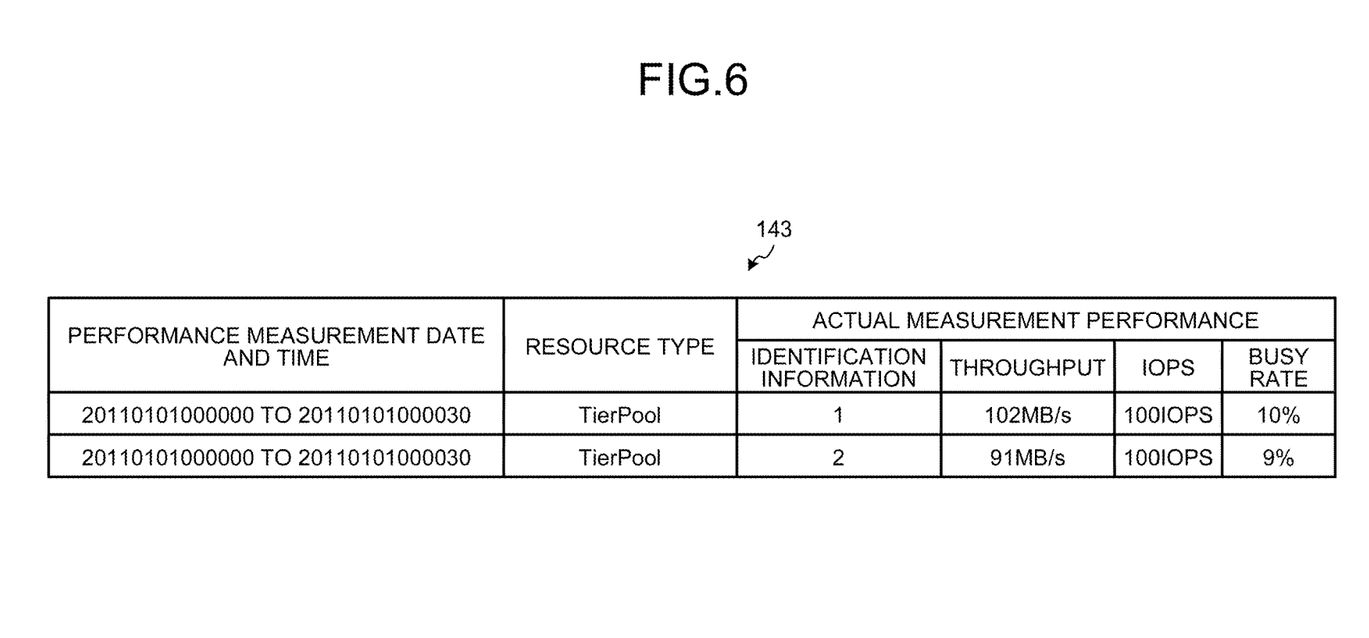
FIG. 6 is a schematic diagram illustrating an example of a Tier performance information file.

FIG. 6 is a schematic diagram illustrating an example of a Tier performance information file. In the Tier performance information file 143, information that indicates the performance of the actual measurement of each of the Tier pools 232 is registered. In the first embodiment, in the Tier performance information file 143, in addition to the performance measurement date and time, the resource type that indicates that the resource type is the Tier pool 232, the identification information of the Tier pool 232, the actual measurement throughput, the actual measurement IOPS, and the Busy rate are registered in an associated manner. In the description below, the Tier identification information, the actual measurement throughput, and the actual measurement IOPS may sometimes be collectively referred to as "performance information on a Tire pool".

The identification information on the Tier pool 232 is information for uniquely specifying the Tier pool 232. The actual measurement throughput is the throughput measured when data is read from and written to one of the Tier pools 232 that includes therein the associated identification information. The actual measurement IOPS is the IOPS measured when data is read from and written to one of the Tier pools 232 that includes therein the associated identification information. The Busy rate is the Busy rate obtained when data is read from and written to one of the Tier pools 232 that includes therein the associated identification information.

A description will be given here by referring back to FIG. 3. The monitoring unit 103 receives, from the operation terminal 3, an instruction to start performance collection received from an operator. Then, the monitoring unit 103 starts periodically receiving, from the performance information acquiring unit 251, the performance information on the volume 231 and the Tier pool 232. Here, the monitoring unit 103 acquires, instead of the Busy rate of the Tier pool 232, the Busy rate of the disk 203 that is included in the Tier pool 232. Then, the monitoring unit 103 calculates a Busy rate of the Tier pool 232 by using the Busy rate of each of the disks 203 included in the Tier pool.

In the first embodiment, the monitoring unit 103 calculates a simple average of the Busy rates of all of the disks 203 included in the certain Tier pool 232 and sets the calculation result as the Busy rate of the subject Tier pool 232. However, the method of calculating the Busy rate of the Tier pool 232 is not limited thereto.

For example, the monitoring unit 103 may also calculate a Busy rate by using the following method. First, the monitoring unit 103 calculates, for each RAID group included in the Tier pool 232, a simple average of the Busy rates of all of the disks 203 included in the subject RAID group. Then, the monitoring unit 103 may also set, as the Busy rate of the Tier pool 232, a weighted average of the weighting that is obtained by multiplying a predetermined coefficient by the Busy rate that is obtained by each RAID group.

Then, the monitoring unit 103 writes the received performance information on each of the volumes 231 to the volume performance information file 142. Furthermore, the monitoring unit 103 writes the received performance information on the Tier pool 232 and the calculated Busy rate to the Tier performance information file 143. The monitoring unit 103 mentioned here corresponds to an example of a "load information acquiring unit".

Here, in the first embodiment, the description has been given by using the volume performance information file 142 and the Tier performance information file 143 illustrated in FIGS. 5 and 6; however, these tables may also have another format. For example, a table that indicates the identification information on the Tier pool 232, a table that indicates the relationship between a RAID group and the Tier pool 232, and a table that indicates the relationship between a disk and a RAID group are stored in the storing unit 104. Furthermore, a table that stores therein the Busy rate of each of the disks 203 is stored in the storing unit 104. Then, the monitoring unit 103 may also write the Busy rate of each of the disks 203 and the maximum performance calculating unit 101 may also calculate a Busy rate of the Tier pool 232.

The maximum performance calculating unit 101 acquires, from a set file or an input received from an operator by using the operation terminal 3, an instruction indicating which one of the IOPS and the throughput is used as the index of a band adjustment. In the description below, the description will be given of a case in which the throughput is designated as the index of the band adjustment. Furthermore, the maximum performance calculating unit 101 specifies, due to an input received from an operator or the like, the Tier pool 232 in which a bandwidth is to be adjusted. Hereinafter, the Tier pool 232 that is specified as the target for the adjustment of the bandwidth of the volume 231 is referred to as the "adjustment target Tier pool 232". Here, in the first embodiment, a description will be given in a case of adjusting a bandwidth of the volume 231 that is included in the specified Tier pool 232; however, for example, the Tier pools 232 are selected one by one and then a bandwidth of the volumes 231 about all of the Tier pool 232 may also be adjusted.

The maximum performance calculating unit 101 acquires information on the actual measurement throughput of the adjustment target Tier pool 232 from the Tier performance information file 143. Furthermore, the maximum performance calculating unit 101 acquires the Busy rate of the adjustment target Tier pool 232 from the Tier performance information file 143.

Then, the maximum performance calculating unit 101 calculates the maximum transfer performance, i.e., the maximum bandwidth, of the adjustment target Tier pool 232 by using Equation (1) below. The maximum transfer performance mentioned here corresponds to an example of the "entire bandwidth".

$$B_{MAX} = \frac{B}{U}\gamma \quad (1)$$

where, $B_{MAX}$ represents the maximum transfer performance of the Tier pool 232. Furthermore, B represents the actual measurement performance of the Tier pool 232 and is, in the first embodiment, the actual measurement throughput. Furthermore, U represents a Busy rate of the Tier pool 232. Furthermore, $\gamma$ represents the constant greater than 0 and equal to or less than 1.

Here, if the coefficient $\gamma$ is not used, in Equation (1), the actual measurement performance is proportional to the Busy rate and, when the Busy rate becomes 100%, the maximum transfer performance is obtained. However, in practice, if the Busy rate becomes high, the performance (throughput) reaches the upper limit. Accordingly, although the Busy rate varies depending on a load pattern of the load related to a Tier, it is conceivable that the transfer performance is the maximum at about 80% of the Busy rate. Thus, it is preferable to set $\gamma$ to 0.8.

Then, the maximum performance calculating unit 101 notifies the bandwidth management unit 102 of the information about the calculated maximum transfer performance of the adjustment target Tier pool 232 together with the identification information about the adjustment target Tier pool 232. The maximum performance calculating unit 101 mentioned here corresponds to an example of a "calculating unit".

The bandwidth management unit 102 receives, from the maximum performance calculating unit 101, the notification of the information about the maximum transfer performance of the adjustment target Tier pool 232 together with the identification information about the adjustment target Tier pool 232. Then, the bandwidth management unit 102 specifies, from the QoS setting table 141, the volumes 231 included in the adjustment target Tier pool 232.

Then, the bandwidth management unit 102 calculates, by using Equation (2) below, each individual bandwidth that is to be allocated to each of the volumes 231 such that each of the bandwidths is equally allocated.

$$B'_i = \frac{B_{MAX}}{N} \quad (2)$$

where, N represents the number of volumes 231 included in the adjustment target Tier pool 232. Furthermore, $B'_i$ represents an individual bandwidth. Furthermore, i represents a number allocated to the volume 231 included in the adjustment target Tier pool 232 and is an integer equal to or greater than 1 and equal to or less than N.

Then, the bandwidth management unit 102 creates a setting command that is used to instruct to set each of the calculated individual bandwidths to each of the volumes 231 included in the adjustment target Tier pool 232. Then, the bandwidth management unit 102 sends the created setting command to the bandwidth control unit 252. The bandwidth management unit 102 mentioned here corresponds to an example of an "allocating unit".

The functions of the maximum performance calculating unit 101, the bandwidth management unit 102, and the monitoring unit 103 are implemented by, for example, a CPU 13 and a memory 12 illustrated in FIG. 2. For example, the HDD 14 stores therein various programs that are used to implement the functions performed by the maximum performance calculating unit 101, the bandwidth management unit 102, and the monitoring unit 103. Then, the CPU 13 reads the various programs from the HDD 14; loads the processes that implement the functions performed by the maximum performance calculating unit 101, the bandwidth management unit 102, and the monitoring unit 103 in the memory 12; and then executes the processes.

The performance information acquiring unit 251 receives an instruction to start the performance collection from the monitoring unit 103. Then, the performance information acquiring unit 251 periodically acquires the performance information on each of the volumes 231, the performance information on each of the Tier pools 232, and the Busy rate of each of the disks 203 and sends the acquired information and the Busy rate to the monitoring unit 103.

The bandwidth control unit 252 receives, from the bandwidth management unit 102, the setting command that is used to instruct the setting of each of the bandwidths to each of the volumes 231 included in the adjustment target Tier pool 232. Then, the bandwidth control unit 252 sets, in accordance with the specified setting command, the bandwidth of the volume 231 specified by each of the setting commands.

Figure 7:
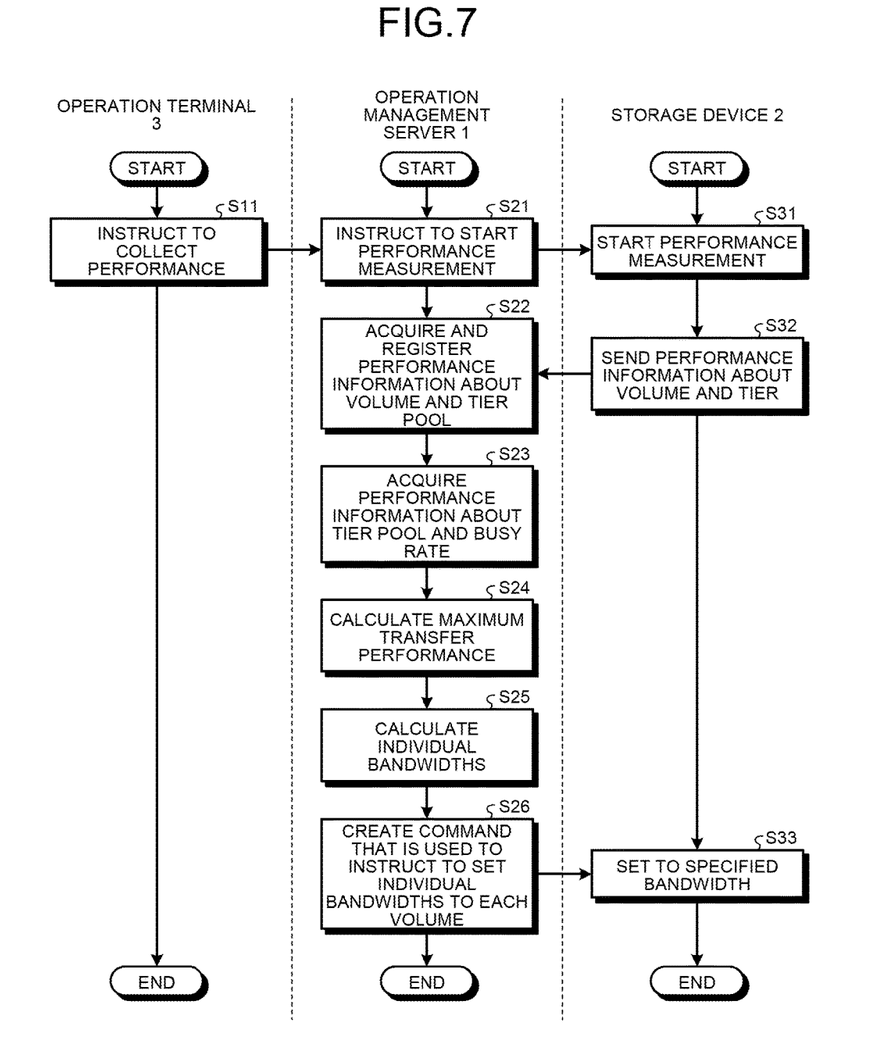
FIG. 7 is a flowchart illustrating the flow of bandwidth control performed in the storage system according to the first embodiment.

In the following, the flow of bandwidth control performed in the storage system according to the first embodiment will be described with reference to FIG. 7. FIG. 7 is a flowchart illustrating the flow of bandwidth control performed in the storage system according to the first embodiment. The flow on the left side illustrated in FIG. 7 indicates the process performed by the operation terminal 3. The flow in the middle illustrated in FIG. 7 indicates the process performed by the operation management server 1. The flow on the right side illustrated in FIG. 7 indicates the process performed by the storage device 2. The arrow that connects each flow indicates that an instruction or data is sent in the direction of the arrow.

In response to an instruction from an operator, the operation terminal 3 instructs the monitoring unit 103 in the operation management server 1 to perform the performance collection (Step S11). Consequently, in the operation management server 1 and the storage device 2, the performance collection of the storage device 2 is started and the adjustment of the bandwidths is performed.

In the following, a process performed by the operation management server 1 will be described. The monitoring unit 103 receives, from the operation terminal 3, an instruction to start the performance measurement. Then, the monitoring unit 103 instructs the performance information acquiring unit 251 in the storage device 2 to start the performance measurement (Step S21).

The monitoring unit 103 acquires the performance information about the volumes 231 and the Tier pools 232 and the Busy rate of each of the disks 203. Then, the monitoring unit 103 calculates a Busy rate of the Tier pool 232 from the Busy rate of each of the disks 203. Then, the monitoring unit 103 registers the performance information about the volume 231 in the volume performance information file 142 and registers the performance information about the Busy rate of the Tier pool 232 in the Tier performance information file 143 (Step S22).

The maximum performance calculating unit 101 acquires actual measurement throughput and the Busy rate of the adjustment target Tier pool 232 from the Tier performance information file 143 (Step S23).

Then, by using the acquired actual measurement throughput and the Busy rate, the maximum performance calculating unit 101 calculates the maximum transfer performance of the adjustment target Tier pool 232 (Step S24). Thereafter, the maximum performance calculating unit 101 sends information about the maximum transfer performance of the adjustment target Tier pool 232 to the bandwidth management unit 102.

The bandwidth management unit 102 receives the information about the maximum transfer performance of the adjustment target Tier pool 232 from the maximum performance calculating unit 101. Then, the bandwidth management unit 102 calculates an individual bandwidth such that the equally divided maximum transfer performance is allocated to each of the volumes 231 included in the adjustment target Tier pool 232 (Step S25).

Then, the bandwidth management unit 102 creates a setting command that is used to instruct to set each individual bandwidth of each of the volumes 231 included in the adjustment target Tier pool 232 (Step S26).

Thereafter, the bandwidth management unit 102 sends the created setting command to the bandwidth control unit 252 (Step S26).

In the following, a process performed by the storage device 2 will be described. The performance information acquiring unit 251 receives an instruction to start the performance measurement from the monitoring unit 103 in the operation management server 1. Then, the performance information acquiring unit 251 starts to measure the performance information about each of the volumes 231 and each of the Tier pools 232 and measure the Busy rate of the disk (Step S31).

Thereafter, the performance information acquiring unit 251 sends the acquired performance information about each of the volumes 231 and each of the Tier pools 232 and the Busy rate of the disk to the bandwidth management unit 102 in the operation management server 1 (Step S32).

Then, in response to the setting command received from the bandwidth management unit 102 in the operation management server 1, the bandwidth control unit 252 sets each of the bandwidths specified to each of the volumes 231 (Step S33).

As described above, the operation management server according to the first embodiment divides the maximum transfer performance of the adjustment target Tier pool and allocates a bandwidth to all of the volumes included in the adjustment target Tier pool. Consequently, it is possible to allocate the bandwidth while reducing the performance interference among the volumes that are included in the Tier pool. Furthermore, because there is no need to specify the bandwidth to each of the volumes, the administrator's work can be reduced.

Furthermore, the adjustment of the bandwidth performed by the operation management server according to the first embodiment is particularly effective in an environment in which the same type of business is allocated to the processes that are performed by each of the volumes included in the adjustment target Tier pool. Conceivable examples of this environment include, for example, a configuration in which a virtual machine is lent for each user and a volume is allocated to each of the virtual machines, a configuration in which, in an operation of a file server, a volume is allocated to each user, or the like.

First Modification

In the following, a first modification will be described. An operation management server according to the first modification differs from that described in the first embodiment in that a different method of dividing the maximum transfer performance performed by the bandwidth management unit is used. Accordingly, in a description below, allocation of each bandwidth to each of the volumes will be mainly described.

The bandwidth management unit 102 receives a notification of information about the maximum transfer performance of the adjustment target Tier pool 232 from the maximum performance calculating unit 101 together with the identification information about the adjustment target Tier pool 232. Then, the bandwidth management unit 102 specifies the volumes 231 included in the adjustment target Tier pool 232 from the QoS setting table 141.

Furthermore, the bandwidth management unit 102 acquires, from the volume performance information file 142, the actual measurement throughput of each of the volumes 231 included in the adjustment target Tier pool 232.

Then, the bandwidth management unit 102 calculates, by using Equation (3) below, each individual bandwidth such that each bandwidth proportional to the load of the actual measurement is allocated to each of the volumes 231.

$$B'_i = \frac{B_{MAX}}{\sum_{j=1}^{N} B_k} B_i \quad (3)$$

where, $B_i$ is the actual measurement throughput of each of the volumes 231.

Then, the bandwidth management unit 102 creates a command that is used to instruct the setting of each of the calculated individual bandwidths to each of the volumes 231 and sends the command to the bandwidth control unit 252.

Second Modification

In the following, a second modification 2 will be described. An operation management server according to the second modification differs from that described in the first embodiment and in the first modification in that a different method of dividing the maximum transfer performance performed by the bandwidth management unit is used. Accordingly, in a description below, allocation of each bandwidth to each of the volumes will be mainly described.

The bandwidth management unit 102 receives a notification of information about the maximum transfer performance of the adjustment target Tier pool 232 from the maximum performance calculating unit 101 together with the identification information about the adjustment target Tier pool 232. Then, the bandwidth management unit 102 specifies the volumes 231 included in the adjustment target Tier pool 232 from the QoS setting table 141.

Furthermore, the bandwidth management unit 102 acquires, from the volume performance information file 142, the actual measurement throughput of each of the volumes 231 included in the adjustment target Tier pool 232.

Then, the bandwidth management unit 102 calculates, by using Equation (4) below, each individual bandwidth such that a medium bandwidth obtained by taking into consideration both a bandwidth in proportion to the load of the actual measurement and an equally divided bandwidth is allocated to each of the volumes 231.

$$B'_i = \alpha B_i + \frac{B_{MAX} - \alpha \sum_{k=1}^{N} B_k}{N} \quad (4)$$

$$0 < \alpha < \frac{B_{MAX}}{\sum_{k=1}^{N} B_k}$$

Here, Equation (4) will be described. In the proportional distribution method described in the first modification 1, an individual bandwidth is proportional to the load of the actual measurement. Namely, if a condition is set as $B'_i = \alpha B_i + b$, in Equation (3), α is a value other than 0 and b is 0. Furthermore, in Equation (2) that is used in the proportional distribution method described in the first embodiment, α is 0 and b is a value other than 0. Equation (4) indicates the method that is set, as a medium method between the method used in the first embodiment and the method used in the first modification, such that α used in $B'_i = \alpha B_i + b$ is set to be the medium between the proportional distribution method and the equal distribution method.

Namely, after the range of α is determined by using the same method used in Equation (3), the constant portion of b is determined such that the sum total of the individual bandwidths corresponds to $B_{MAX}$ that is the maximum transfer performance.

Namely, this can be represented by Equation (5) below.

$$B_{MAX} = \sum_{k=1}^{N} B'_k = \sum_{k=1}^{N} (\alpha B_k + b) = \alpha \sum_{k=1}^{N} B_k + Nb \quad (5)$$

When b is solved by using Equation (5), Equation (6) below can be obtained.

$$b = \frac{B_{MAX} - \alpha \sum_{k=1}^{N} B_k}{N} \quad (6)$$

By substituting b obtained from Equation 6 above into $B'_i = \alpha B_i + b$, calculation of Equation (4) can be obtained.

When Equations (2) and (3) are compared with Equation (4), the term of $\alpha B_i$ in Equation (4) is different from the right side of Equation (3) in terms of the inclination. If α is made to the same as that of the right side of Equation (3), Equation (4) can be transformed to Equation (3). Furthermore, if α is set to 0 and if the remaining constant terms are set such that the sum of $B'_i$ becomes equal to $B_{MAX}$, Equation (4) is transformed to Equation (2). Thus, it is conceivable that Equation (4) is a medium equation that includes the elements of both Equation (2) and Equation (3). Furthermore, if α is used in Equation (7) below, Equation (4) becomes a comprehensive formula including Equations (2) and (3).

$$0 \leq \alpha \leq \frac{B_{MAX}}{\sum_{k=1}^{N} B_k} \quad (7)$$

Then, the bandwidth management unit 102 creates a command that is used to instruct the setting of the calculated individual bandwidth to each of the volumes 231 and sends the created command to the bandwidth control unit 252.

As described in the first and the second modifications, if the method of dividing the maximum transfer performance is used, various methods can be used for a method of calculating an individual bandwidth. Namely, if the bandwidth management unit divides the maximum transfer performance of the adjustment target Tier pool and allocates the divided transfer performance to each of the volumes on the basis of a predetermined rule, there is no particular limitation on that rule. Furthermore, even if any of the rules is used, by dividing the maximum transfer performance of the adjustment target Tier pool and allocating each bandwidth of each of the volumes, the allocation of each of the bandwidths can be performed by reducing the performance interference between the volumes. Furthermore, because there is no need to specify a bandwidth with respect to each of the volumes, the administrator's work can be reduced.

Furthermore, the description in the above, the throughput is used as an example; however, as described above, an individual bandwidth may also be calculated by using the IOPS as the actual measurement performance. However, if IOPS is used, it is preferable to convert to the throughput by using an amount of data as a reference and perform the comparison with the maximum transfer performance.

[b] Second Embodiment

In the following, a second embodiment will be described. An operation management server according to the second embodiment makes individual bandwidths, which are to be allocated, different in accordance with the relationship between the sum total of actual loads (a use bandwidth that is actually used) and the maximum transfer performance. The operation management server according to the second embodiment is also represented by the block diagram illustrated in FIG. 3. In a description below, it is assumed that components having the same function as that performed in the first embodiment have the same function unless otherwise noted.

The bandwidth management unit 102 receives a notification of information about the maximum transfer performance of the adjustment target Tier pool 232 from the maximum performance calculating unit 101 together with the identification information about the adjustment target Tier pool 232. Then, the bandwidth management unit 102 specifies the volumes 231 included in the adjustment target Tier pool 232 from the QoS setting table 141.

Furthermore, the bandwidth management unit 102 acquires, from the volume performance information file 142, the actual measurement throughput of each of the volumes 231 included in the adjustment target Tier pool 232.

Then, the bandwidth management unit 102 calculates the sum of the maximum values, obtained within a predetermined time period, of the actual measurement throughput of the volumes 231 included in the adjustment target Tier pool 232. The sum mentioned here is referred to as the "sum of the actual measurement throughput". Then, the bandwidth management unit 102 compares the sum of the actual measurement throughput with the maximum transfer performance. Here, the sum of the actual measurement throughput may also be calculated by using another method. For example, the sum of average values obtained within a predetermined time period may also be used.

If the sum of the actual measurement throughput is equal to or less than the maximum transfer performance, the bandwidth management unit 102 sets the actual measurement throughput of each of the volumes 231 as each individual bandwidth of each of the volumes 231.

In contrast, if the maximum transfer performance is less than the sum of the actual measurement throughput, the bandwidth management unit 102 obtains each individual bandwidth by performing proportional distribution on the maximum transfer performance in accordance with the load, i.e., the actual measurement throughput, of each of the volumes 231.

Namely, the bandwidth management unit 102 calculates each individual bandwidth of each of the volumes 231 included in the adjustment target Tier pool 232 by using Equation (8) below.

$$\begin{cases} B'_i = B_i \text{ if } B_{MAX} \geq \sum_{k=1}^{N} B_k \\ B'_i = \frac{B_{MAX}}{\sum_{k=1}^{N} B_k} B_i \text{ if } B_{MAX} \geq \sum_{k=1}^{N} B_k \end{cases} \quad (8)$$

As described above, with the operation management server according to the second embodiment, if the sum of the actual loads is equal to or less than the maximum transfer performance, the actual load is set to the individual bandwidth, whereas, if the sum of the actual loads is greater than the maximum transfer performance, an individual bandwidth is obtained by performing proportional distribution on the maximum transfer performance in accordance with the load. Consequently, it is possible to reduce the allocation of an unnecessary bandwidth and thus the resources of the storage system can be effectively used.

[c] Third Embodiment

In the following, a third embodiment will be described. An operation management server according to the third embodiment makes individual bandwidths that are to be allocated in accordance with the performance level specified by an operator different. The operation management server according to the third embodiment is also represented by the block diagram illustrated in FIG. 3. In a description below, it is assumed that components having the same function as that performed in the first embodiment have the same function unless otherwise noted.

The operator inputs, by using the operation terminal 3, a performance level that is set to each of the volumes 231. The performance level mentioned here is the index that is used to adjust the performance of the volumes 231 such that the performance is increased or decreased. For example, in the third embodiment, it is assumed that the performance levels are represented by three stages: high performance, medium performance, and low performance.

The bandwidth management unit 102 stores therein the medium performance as the default value of the performance of each of the volumes 231. Furthermore, the bandwidth management unit 102 previously stores therein the performance ratio of each of the performance levels. For example, in the third embodiment, the bandwidth management unit 102 stores therein the performance ratio as high performance:medium performance:low performance=2:1:0.5.

The bandwidth management unit 102 receives an input of the performance level of each of the volumes 231 from the operation terminal 3. In response to the input of the performance level, the bandwidth management unit 102 calculates an individual bandwidth by using Equation (9) below.

$$B'_i = \alpha P_i B_i + \frac{B_{MAX} - \alpha \sum_{k=0}^{N} P_k B_k}{N} \quad (9)$$

where, $P_i$ is a value of the performance ratio with respect to the performance level allocated to the $i^{th}$ volume 231. For example, if the performance ratio is represented by high performance:medium performance:low performance=2:1:0.5 and $i^{th}$ volume 231 is set to the low performance, $P_i$=0.5 is given.

As for Equation (9), after the coefficient $\alpha$ is determined, the constant portion of b in $B'_i = \alpha P_i B_i + b$ is also determined such that the allocated sum corresponds to the maximum performance.

Namely, first, Equation (10) below is given.

$$B_{MAX} = \sum_{k=1}^{N} B'_k = \sum_{k=1}^{N} (\alpha P_k B_k + b) = \alpha \sum_{k=1}^{N} P_k B_k + Nb \quad (10)$$

When b is solved by using Equation (10), Equation (11) below can be obtained.

$$b = \frac{B_{MAX} - \alpha \sum_{k=1}^{N} P_k B_k + Nb}{N} \quad (11)$$

By substituting b obtained from Equation (11) above into $B'_i = \alpha P_i B_i + b$, calculation of Equation (9) can be obtained.

Then, the bandwidth management unit 102 creates a command that is used to instruct the setting of each of the calculated individual bandwidths to each of the volumes 231 and sends the created command to the bandwidth control unit 252.

As described above, the operation management server according to the third embodiment allocates, as each individual bandwidth to each of the volumes, each bandwidth that is adjusted in accordance with the specified performance level. Consequently, it is possible to allocate the bandwidths in accordance with a request of an operator.

[d] Fourth Embodiment

In the following, a fourth embodiment will be described. An operation management server according to the fourth embodiment makes distribution of bandwidths different in accordance with the type of the business that is a process that uses each of the volumes included in the adjustment target Tier pool. The operation management server according to the fourth embodiment is also represented by the block diagram illustrated in FIG. 3. In a description below, it is assumed that components having the same function as that performed in the first embodiment have the same function unless otherwise noted.

The function of distributing the maximum transfer performance by using the bandwidths in accordance with a certain rule is particularly effective for the same type of business in which the occurrence patterns of loads are similar. Furthermore, if business differs, the occurrence patterns of loads also differ. Thus, it is preferable to determine, in accordance with the business to be processed, whether the actual measurement performance that is used as the determination reference is obtained from the throughput or the IOPS and, furthermore, it is also preferable to select a method of distributing the bandwidths in accordance with the business. Accordingly, the bandwidth management unit 102 according to the fourth embodiment has the following function.

Figure 8:
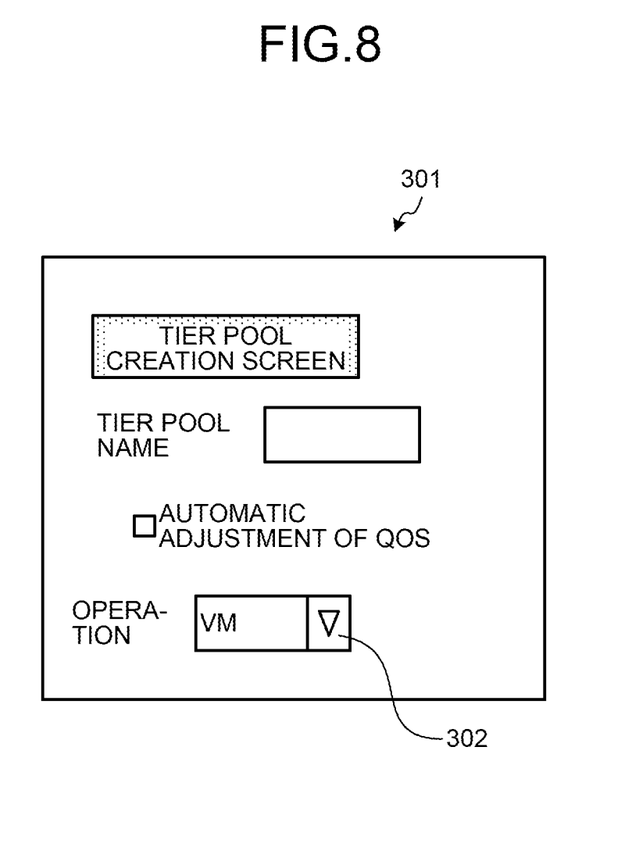
FIG. 8 is a schematic diagram illustrating an example of a screen on which the type of business is input.

The operation terminal 3 displays, on a monitor held by the operation terminal 3 or the like, a screen on which the type of the business to be processed by using the volumes 231 included in the Tier pool 232 is input. For example, in response to an instruction from the operation management server 1, the operation terminal 3 displays the screen. This screen is, for example, a screen 301 illustrated in FIG. 8. FIG. 8 is a schematic diagram illustrating an example of a screen on which the type of the business is input.

An operator inputs, on, for example, the screen, the identification information on the Tier pool 232 or an instruction indicating whether automatic adjustment of the QoS is performed. Furthermore, the operator selects a button 302 on the screen 301 and displays a pull down list. Then, the operator inputs the type of the business that is processed by using the volumes 231 included in the Tier pool 232 associated with the identification information that is input from the list. For example, a virtual machine, a file server, or the like may be used for the business. The virtual machine (VM) illustrated in FIG. 8 represents a virtual machine.

The maximum performance calculating unit 101 previously stores therein, for each type of the business, the type of the index of the actual measurement performance that is used to adjust a band. Furthermore, the maximum performance calculating unit 101 previously stores therein, for each type of the business, the value of γ used in Equation (1). For example, if the business is performed by a virtual machine, the maximum performance calculating unit 101 uses the IOPS as the index of the performance, whereas, if the business is performed by a file server, the maximum performance calculating unit 101 stores therein information indicating that throughput is used as the index of the performance. Furthermore, for example, the maximum performance calculating unit 101 stores therein γ=0.6 if the business is performed by the virtual machine and stores therein γ=0.8 if the business is performed by the file server.

The maximum performance calculating unit 101 receives an input of the type of the business to be processed by using the volumes 231 included in the Tier pool 232 from the operation terminal 3 together with the identification information about the Tier pool 232. Then, the bandwidth management unit 102 stores therein the type of the business associated with each of the Tier pools 232.

Then, the maximum performance calculating unit 101 specifies the business associated with the adjustment target Tier pool 232 and acquires the performance and the busy rate of the actual measurement of the index associated with the subject business. Then, the bandwidth management unit 102 calculates the maximum transfer performance.

The maximum performance calculating unit 101 sends, to the bandwidth management unit 102, the information on the index associated with the subject business, the identification information about the Tier pool 232 that is targeted for a check, information about the maximum transfer performance, and information about the business associated with the adjustment target Tier pool 232.

The bandwidth management unit 102 previously stores therein, for each type of the business, the value of $\alpha$ that is used in Equation (2). For example, the maximum performance calculating unit 101 stores therein $\alpha=1$ if the business is performed by the virtual machine and stores therein $\alpha=0.5$ if the business is performed by the file server.

The bandwidth management unit 102 specifies $\alpha$ that is in accordance with the type of the business associated with the adjustment target Tier pool 232.

The bandwidth management unit 102 acquires the performance of the actual measurement of the index associated with the business of each of the volumes 231. Then, the bandwidth management unit 102 calculates each individual bandwidth by using the acquired performance of the actual measurement, the maximum transfer performance, and the acquired value of $\alpha$.

Then, the bandwidth management unit 102 creates a command that is used to instruct the setting of the calculated individual bandwidth to each of the volumes 231 and sends the created command to the bandwidth control unit 252.

As described above, the operation management server according to the fourth embodiment calculates an individual bandwidth by varying the index or the parameter of the performance in accordance with the content of the business processed by using each volume. Consequently, it is possible to perform appropriate allocation of a bandwidth in accordance with the content of the business.

[e] Fifth Embodiment

In the following, a fifth embodiment will be described. An operation management server according to the fifth embodiment calculates an individual bandwidth by using the actual measurement performance related to not only the immediate previous performance but also the past performance. The operation management server according to the fifth embodiment is also represented by the block diagram illustrated in FIG. 3. In a description below, it is assumed that components having the same function as that performed in the first embodiment have the same function unless otherwise noted. Furthermore, in the description below, the description will be given of a case in which the throughput is used, as the index of the performance, for the distribution of a bandwidth.

The storing unit 104 accumulates, for one day or more in the volume performance information file 142, the performance information about the volumes 231.

The bandwidth management unit 102 acquires, from the volume performance information file 142, the immediately previous actual measurement throughput and the actual measurement throughput obtained at the same time on a day before the immediately previous acquisition. Then, the bandwidth management unit 102 calculates the average between the immediately previous actual measurement throughput and the actual measurement throughput obtained at the same time on a day before the immediately previous acquisition. Here, in the fifth embodiment, the bandwidth management unit 102 uses the value obtained at the same time on a day before the immediately previous acquisition; however, the value is not limited thereto but another value may also be used as long as the value is obtained at the same time more than one day before the immediately previous acquisition.

The bandwidth management unit 102 calculates an individual bandwidth that is allocated to each of the volumes 231 by using the calculated actual measurement throughput.

As described above, the operation management server according to the fifth embodiment calculates each individual bandwidth by using the average between the immediately previous actual measurement performance and the actual measurement performance recorded at the same time on a day before the immediately previous acquisition. Consequently, a sufficient band can be ensured if the load is estimated to be suddenly increased immediately after the measurement of the actual measurement performance. For example, there may be a case in which a load is sharply increased at a set time, such as the boot up time or the start time of a batch process at night. In such a case, the operation management server according to the fifth embodiment can allocate a band by estimating, from the past load, that the load is sharply increased. Furthermore, by taking into consideration of the immediate previous load, the operation management server can cope with a case in which the boot up time is changed or a case in which interrupt business is received.

Furthermore, in the description above, the storing unit 104 holds all of the measurement results for one day or more; however, another method may also be used for the method of holding the measurement results. For example, the storing unit 104 may also hold only the maximum performance obtained every one hour for one day or more and another piece of information may also be discarded.

In this case, if the performance information acquired in the predetermined time period is less than the maximum value that has already been acquired in the predetermined time period, the storing unit 104 may discard information and, if the subject information is greater than the subject maximum value, the storing unit 104 may overwrite the information as the maximum value.

As described above, with the method of holding the maximum value acquired in the predetermined time period, an amount of information stored can be greatly reduced when compared with a case in which all of the measurement results are held. Furthermore, the accuracy of the allocation of each bandwidth within a short period of time is decreased when compared with a case in which all of the measurement results are held. However, it is conceivable that bands are not needed to be allocated in accordance with the measurement performance acquired from the past short time periods. However, even if a method of holding the maximum value acquired in the predetermined time period is used, it is conceivable that this method can be used in a case of an increase in loads due to the boot up time or a batch process performed at night. Consequently, the effect of ensuring adequate bands can be sufficiently obtained when the load is expected to be suddenly increased.

According to an aspect of an embodiment of the storage management device, the storage management method, and the storage management program disclosed in the present invention, an advantage is provided in that a band limit width can be easily adjusted while performance interference is reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management device comprising:
a memory; and
a controller that acquires load information on a storage area group that includes a plurality of storage areas, and stores the load information in the memory,
calculates an entire bandwidth of the storage area group based on the acquired load information on the storage area group,
holds coefficients indicating rates of proportional distribution in an equation for calculating each individual bandwidth allocated to each of the plurality of storage areas at each process of the calculating,
acquires coefficients corresponding to a notified process upon receiving a notification of an executed process using the each of the plurality of storage areas,
calculates each individual bandwidth using acquired coefficients by performing a proportional distribution method and an equal distribution method, and
allocates each of the individual bandwidths to each of the storage areas.

2. The storage management device according to claim 1, wherein the controller calculates each of the individual bandwidths by equally dividing the entire bandwidth by a number of the storage areas included in the storage area group.

3. The storage management device according to claim 1, wherein the controller calculates each of the individual bandwidths by setting the average between load information acquired by an immediately previous measurement on each of the storage areas and load information on each of the storage areas obtained at the same time on a day or more before the immediately previous measurement as the load information on each of the storage areas.

4. The storage management device according to claim 1, wherein the controller calculates, from each of pieces of the load information on each of the storage areas, each use bandwidth that is used by each of the storage areas such that, when a sum of the calculated use bandwidths is equal to or less than the entire bandwidth, each of the use bandwidths corresponds to each of the individual bandwidths and, when the sum of the calculated use bandwidths is greater than the entire bandwidth, the sum of the individual bandwidths allocated to each of the storage areas corresponds to the entire bandwidth divided in proportion to the load information.

5. The storage management device according to claim 1, wherein, in response to specification of a performance level with respect to each of the storage areas, the controller calculates, on the basis of the performance level, each of the individual bandwidths such that the sum of the individual bandwidths allocated to each of the storage areas corresponds to the entire bandwidth divided in proportion to the performance ratio.

6. The storage management device according to claim 1, wherein the controller stores in the controller a plurality of parameters that is used to calculate the individual bandwidths, acquires information about a process that is performed by using the storage area group, changes the parameters on the basis of the process, and calculates each of the individual bandwidths such that the sum of the individual bandwidths allocated to each of the storage areas corresponds to the entire bandwidth.

7. The storage management device according to claim 1, wherein the controller acquires load information on each of the storage areas, divides the entire bandwidth in proportion to the load information on each of the storage areas, and calculates each of the individual bandwidths.

8. A storage management method comprising:
acquiring load information on a storage area group that includes a plurality of storage areas;
calculating, using a processor, an entire bandwidth of the storage area group based on the acquired load information on the storage area group;
holding, using the processor, coefficients indicating rates of proportional distribution in an equation for calculating each individual bandwidth allocated to each of the plurality of storage areas at each process of the calculating;
acquiring, using the processor, coefficients corresponding to a notified process upon receiving a notification of an executed process using the each of the plurality of storage areas;
storing the coefficients in a performance information file;
calculating, using the processor, each individual bandwidth using the coefficients in the performance information file by performing a proportional distribution method and an equal distribution method, and
allocating, using the processor, each of the individual bandwidths to each of the storage areas.

9. A non-transitory computer-readable recording medium having stored therein a storage management program that causes a computer to execute a process comprising:
acquiring load information on a storage area group that includes a plurality of storage areas;
calculating an entire bandwidth of the storage area group based on the acquired load information on the storage area group;
holding coefficients indicating rates of proportional distribution in an equation for calculating each individual bandwidth allocated to each of the plurality of storage areas at each process of the calculating;
acquiring coefficients corresponding to a notified process upon receiving a notification of an executed process using the each of the plurality of storage areas;
calculating each individual bandwidth using acquired coefficients by performing a proportional distribution method and an equal distribution method, and
allocating each of the individual bandwidths to each of the storage areas.

* * * * *